Patented June 10, 1924.

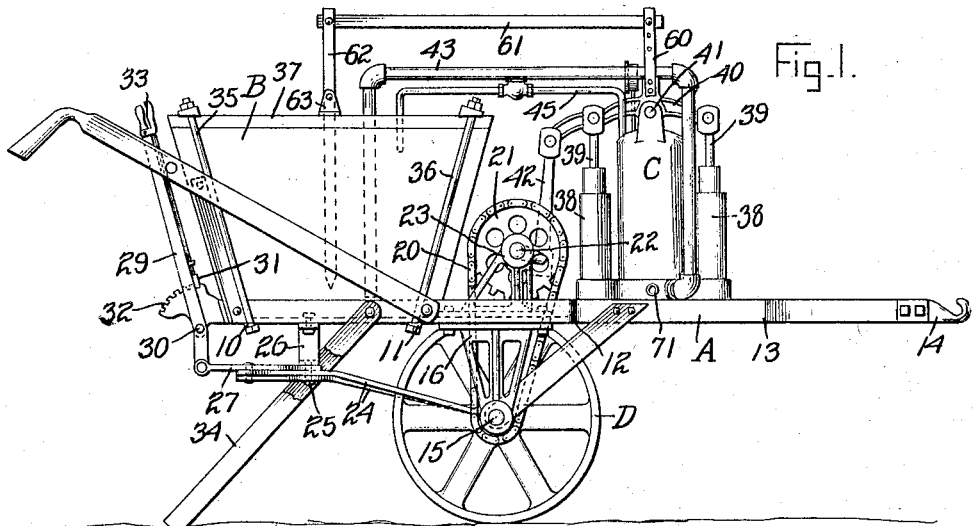

1,497,637

UNITED STATES PATENT OFFICE.

VINCE S. POLK, JOHN B. HUNT, AND WILMER P. DAVIS, OF WAUCHULA, FLORIDA.

VEGETABLE-VINE-SPRAYING MACHINE.

Application filed September 2, 1921. Serial No. 497,986.

*To all whom it may concern:*

Be it known that we, VINCE S. POLK, JOHN B. HUNT, and WILMER P. DAVIS, citizens of the United States, residing at Wauchula, in the county of Hardee and State of Florida, have invented certain new and useful Improvements in Vegetable-Vine-Spraying Machines, of which the following is a specification.

As is well known, in the raising of vegetables having vines of the running variety, particularly cucumbers and watermelons, which is a very considerable industry in our locality, it is necessary at intervals to spray the vines with a solution to destroy the insects which infest such vines. Because of the fact that the vines soon spread over the ground, spraying apparatus of the usual type mounted upon wheels has been found practically useless because of the fact that the wheels cannot be so guided as to avoid the vines and if such machines are used the vines are inevitably cut and bruised by the wheels to the great injury of the vines and deterioration of their bearing capacity. For these reasons the spraying of such vines is commonly accomplished by an apparatus carried manually upon the shoulders and the operation is almost entirely a manual one. It will thus be seen that the labor incident to the care of extensive fields of cucumber, watermelon, and such like vegetable vines, such as are common in many sections, particularly in parts of Florida, is very heavy and tiresome and also requires a considerable amount of time or a considerable number of men, and adds materially to the expense of the cultivation of such fields.

The object of our said invention is to provide an apparatus designed to be drawn by animal power, preferably a single horse or mule, to be guided among the vines of such a field and capable of being guided by an operator so as to avoid contact with the vines, and injury thereto, and also one wherein the spray will be forced against the vines with sufficient pressure to penetrate to the insects and accomplish their destruction, the pressure being generated by power derived from the traction wheel. Other objects and advantages will be pointed out in the further description of the construction and operation of the apparatus.

Referring to the accompanying drawings which are made a part hereof and on which similar reference characters indicate similar parts.

Figure 1 is a side elevation of a vegetable vine spraying apparatus of the type referred to and embodying the various improvements in construction and arrangements constituting our said invention, Figure 2, a top or plan view of the same, and Figure 3 a detail plan view of the traction wheel and clutch mechanism for coupling and uncoupling the same with a pumping apparatus.

In said drawings the portions marked A represent the main supporting framework of the apparatus, B the tank, C the pressure cylinder, and D the traction wheel.

The supporting frame A consists of side members of appropriate shape substantially as best shown in Figure 2, their rear ends being spaced apart and connected by cross members 10 and 11 to form a structure appropriate for the support of the tank B. They are formed with an offset portion at point 12 forming a narrow frame for supporting pressure tank C and associate pumps. At point 13 they are preferably at an angle and continue to a meeting point at the front end where they are secured together by bolts, an attaching hook 14 being preferably interposed between them.

The tank B of appropriate size and structure is mounted upon the rear end and the pressure cylinder C and pump on the forward portion, the whole being supported by the traction wheel D mounted on an axle 15 supported in boxes carried on the lower end of brackets 16 which depend from the members of the frame A midway thereof. The hub of said traction wheel D has clutch members 17 formed on its opposite ends with which sliding clutch members 18 are adapted to engage. Said sliding clutch members 18 carry sprocket wheels 19 and sprocket chains 20 connect said sprocket wheels 19 with other sprocket wheels 21 mounted on a crank-shaft 22, which is supported in boxes on brackets 23 mounted on the top of the members of frame A, as shown. Said clutch members 18 are each provided with grooves engaged by a fork formed on the front end of shifting levers 24 pivoted at 25 on a cross member 26 secured to the underside of frame A. A sliding plate 27 is formed with diagonal slots 28 which engage pins in the outer ends of levers 24 in the rear of pivot 25 and said plate 27 is connected to a hand lever 29 pivoted at 30 to a bracket on the rear of the frame and secured by a pawl 31 engaging a notched segment 32 as shown. Said pawl 31 is operated by a hand lever 33 adjacent to the upper end of lever 29 as is common. By this means, as will be readily understood, the operation of lever 29 on its pivot 30 slides plate 27 back and forth and through the medium of the plate 27 engaging the pins on the rear ends of the levers 24 operates to throw the inner ends of said levers in and out carrying with them clutch parts 18 and thus operating to engage and disengage said clutch parts with the traction wheel D to operate the crank-shaft or disconnect the same at will.

The traction wheel D, as will be noted, has a comparatively wide face in order that it may be capable of developing the power required to operate the pump. It is held centrally of its shaft and pivoted supporting legs 34 are mounted on the frame in the rear of the wheel to prevent the machine from tilting sidewise, and to support it when at rest. These legs may be held so that they will be free from the ground during the operation of the machine.

The tank B is securely fastened to the frame A by bolts 35 and 36 extending through cross pieces which extend across the top of the tank and cross members 10 and 11 which extend from side to side of the frame beneath. These bolts not only securely hold the tank in place but also clamp the cover 37 securely thereon to prevent the liquid spray contained therein from escaping.

The force pump shown is the common type, comprising a pressure cylinder C and pumping cylinders 38, the piston rods 39 of which connect with a walking beam 40 pivoted at 41 to brackets on the top of cylinder C. A pitman rod 42 connects one end of said walking beam with the crank of the crankshaft 22 for operating same. A suction pipe 43 extends from a point near the bottom of tank B into the lower end of cylinder C and the pumps 38 in operation force the liquid from tank B through said pipe 43 into the lower end of cylinder C against a trapped body of air in its upper end which is compressed thereby, thus holding the liquid in said cylinder under pressure until a certain pressure is reached which overcomes a checkvalve in a return pipe 45 and permits the liquid to return through said pipe into tank B until the pressure drops below a predetermined point. Spray nozzles 70 are connected to discharge pipes 71 by flexible joints 72 for directing the spray to the vines as desired.

Mounted on the walking beam 40 is a standard 60 connected by a connecting rod 61 with the upper end of an agitator 62 which is pivoted on a bracket 63 on the cover of the tank, the agitator paddle extending through said cover into the tank so that as the walking beam travels up and down the agitator paddle is moved back and forth on its pivot keeping the liquid in the tank constantly agitated.

The operation will be readily understood from the foregoing description but may be briefly recapitulated as follows: The machine being drawn by a horse or mule, the operator through the medium of the handle guides the wheel D among the vines so as to avoid contact therewith. It will be understood, of course, that in such fields the hills of the plants are widely separated and the vines spread over large areas of ground. In instances where the vines have extended to cross the space between the hills the ends of the vines can be easily moved aside by hand prior to driving the machine between the rows for a space sufficient to permit the passage of the traction wheel D without contact therewith. By this means a machine for this purpose is provided in which a pressure sufficient to expel the liquid through the spray nozzles 70 with sufficient force to accomplish the purpose desired is provided and the necessity of doing this heavy and tiresome work manually is avoided.

Having thus fully described our said invention, what we claim as new and desire to secure by Letters Patent is:

1. A spraying machine comprising a frame, a wheel supporting the frame, a tank at the rear of the frame and a compression cylinder at the front thereof, spray nozzles in communication with said compression cylinder, means operated by said wheel for supplying fluid to said compression cylinder under pressure, clutch members at each side of the wheel, a lever for each clutch member and a centrally disposed handlever for operating said clutch members simultaneously, substantially as set forth.

2. A spraying machine comprising a frame, a wheel supporting the frame, a tank at the rear of the frame and a compression cylinder at the front thereof, a pump for supplying fluid to said compression cylinder under pressure, spray nozzles in communication with said compression cylinder, clutch members at each side of the wheel, a walking beam for operating the pump, a crank shaft connected to the walking beam, gearing connecting each clutch member to the crank shaft, a lever for each clutch member and a handlever adapted to operate said clutch levers, substantially as set forth.

3. A spraying machine comprising a frame, a single wheel supporting the frame, a tank at the rear end of the frame, and a pump at the front end alined with the wheel, a clutch at each side of the wheel, a walking beam for operating the pump; a crankshaft connected to the walking beam, sprocket gearing leading from each clutch to the crankshaft, a lever for each clutch and a handlever in line with said wheel and adapted to operate said clutch levers simultaneously, substantially as set forth.

In witness whereof, we have hereunto set our hands and seals at Wauchula, Florida, this 20th day of August, A. D. nineteen hundred and twenty-one.

VINCE S. POLK. [L. S.]
JOHN B. HUNT. [L. S.]
WILMER P. DAVIS. [L. S.]

Witnesses:
J. A. HUTSON,
I. P. BARLOW.